US005225688A

United States Patent [19]

Endo

[11] Patent Number: 5,225,688

[45] Date of Patent: Jul. 6, 1993

[54] ORIGINAL AND ORIGINAL SIZE DETECTING DEVICE

[75] Inventor: Hideki Endo, Osaka, Japan

[73] Assignee: Mita Industrial Co., Ltd., Osaka, Japan

[21] Appl. No.: 901,985

[22] Filed: Jun. 22, 1992

[30] Foreign Application Priority Data

Jun. 24, 1991 [JP] Japan ................................ 3-151802

[51] Int. Cl.[5] ............................................ G01N 21/86

[52] U.S. Cl. .................................... 250/560; 358/488; 355/311

[58] Field of Search ................ 250/560, 561; 358/488; 355/311

[56] References Cited

U.S. PATENT DOCUMENTS

| | | | |
|---|---|---|---|
| 4,505,574 | 3/1985 | Kurata et al. | 355/14 E |
| 4,572,650 | 2/1986 | Okuda | 250/560 |
| 4,614,874 | 9/1986 | Fukuda et al. | 250/560 |
| 4,713,550 | 12/1987 | Anzai et al. | 250/560 |
| 4,778,272 | 10/1988 | Asakura | 356/372 |

FOREIGN PATENT DOCUMENTS 2148069 6/1990 Japan .

*Primary Examiner*—David C. Nelms
*Assistant Examiner*—T. Davenport
*Attorney, Agent, or Firm*—Cushman, Darby & Cushman

[57] ABSTRACT

A device for detecting the presence or absence of an original and size thereof and corresponding method therefore. The device is provided on an image forming apparatus, and provides accurate detection of an original and an original's size in the presence of external light. External light is detected during the non-emission state of a light emitting element and used to correct a reference value. The corrected reference value is then compared to a detected value of light emitted from the light emitting element and reflecting from an original, if one is present. Based on the comparison a determination is made as to the presence of an original. When an original is present the light emitting element traverses across the glass contact plate of the image forming apparatus on which the original is placed. Upon the determination of an absence of the original, the light emitting element halts its movement. The distance travelled by the light emitting element is then used to determine the size of the original.

14 Claims, 6 Drawing Sheets

ORIGINAL AND ORIGINAL SIZE DETECTING DEVICE

BACKGROUND OF THE INVENTION

1. Field of the Invention

This invention relates to an original and original size detecting device in an image forming apparatus.

2. Description of the Related Art

In a conventional image forming apparatus, such as shown in FIGS. 1 and 8, in the detection of the size of an original is performed by a reflection type sensor 10 mounted on a first mirror frame 12 so that the reflection type sensor 10 moves with the first mirror frame 12. In the reflection type sensor 10, light emitting means, namely, a light emitting element 1 and detecting means constituted by photo-transistor, namely, a light receiving element 2 are provided adjacent to each other. To detect the size of an original placed on a contact glass plate 26, the first mirror frame 12 is moved from the side of one end of the original to the side of the other end while an original retainer 11 is open. During this movement, the light emitting element 1 of the reflection type sensor 10, mounted on the first mirror frame 12, emits light to irradiate the original. The light receiving element 2, moving together with the light emitting element 1, receives light reflected from the original. When the light emitting element 2 is moved to the other end of the original where the light reflected from the original can no longer be detected, the first mirror frame 12 is stopped. Thus, the size of the original is detected from the distance the first mirror frame 12 has moved.

As was described above, while the reflection type sensor 10 is being moved, the light emitting element 1 emits light based on instructions from control means 57, and the light receiving element 2 receives light reflected from the original. As shown in FIG. 8 , the reflection type sensor 10 is provided with determining means 3 for determining the presence or absence of an original. The determining means 3 compares the output signal from the light receiving element 2, a detection value, with a reference value which has been set by a reference value setting means 5. When the determining means 3 determines from the comparison that the light reflected from the original is no longer being received, the distance the reflection type sensor 10 has moved is measured to determine the size of the original by control means 57.

In the conventional original size detecting device, the size of an original is detected with the original retainer 11 open. Hence, when the light emitting element 1 emits light and the light receiving element 2 receives light reflected from the original, external light, such as light from a florescent lamp or sunlight, may be received by the light receiving element 2 increasing the detection output of the light receiving element 2. Thus, even when the light receiving element 2 has been moved to the position where the original is not present (i.e., the original is not covering that part of cover glass plate 26 where the reflected type sensor 10 is currently positioned), the presence of an the original will be erroneously determined. The erroneous determination occurs because the external light causes the light receiving element 2 to produce a detection value which when compared with the predetermined reference value set by the reference value setting means 5 indicates that the original is present. As a result, the detected size of the original is not correct.

SUMMARY OF THE INVENTION

An object of this invention is to eliminate the above-described difficulty accompanying a conventional original and original size detecting device. More specifically, an object of the present invention is to provide an original and original size detecting device which is able to detect the size of an original with high accuracy when external light is present.

The foregoing object of the present invention has been achieved by the provision of an original and original size detecting device provided on an image forming apparatus. The image forming apparatus has a contact glass upon which is placed an original whose image is to be formed by the image forming apparatus. One end of the original and the contact glass are aligned. The device includes light emitting means, disposed at one end of the contact glass and on an opposite side of the contact glass from the original, the light emitting means traversing from the one end of the contact glass to another end of the contact glass; light emission control means for controlling the periodic emission and non-emission of light from the light emitting means; light detecting means for detecting light emitted from the light emitting means and reflected by the original, and for detecting external light according to a signal which the light emission control means provides in response to the non-emission of light from the light emitting means; reference value setting means for setting a reference value; reference value correcting means for determining a correcting value based on the detected external light, and for correcting the reference value using the correcting value so that the reference value setting means sets a corrected reference value; determining means for determining the presence/absence of an original at a position of the light emitting means based on output from the light detecting means and the corrected reference value; and size determining means for determining a size of the original from a distance the light emitting means traversed across the contact glass until the determining means indicated an absence of the original.

In the original size detecting device of the present invention, the light emission control means causes the light emitting means to emit light periodically, and the light detecting means detects light emitted from the light emitting means. When the light emitting means emits no light, the light detecting means detects external light. Then the reference value correcting means corrects the reference value provided by the reference value setting means using a correcting value corresponding to the external light thus detected. The determining means then compares the corrected reference value with the detection value provided by the first detecting means to determine the presence or absence of the original; thereby accurately detecting the size of the original in the presence of external light.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DETAILED DESCRIPTION OF THE PREFERRED EMBODIMENTS

Figure 1:
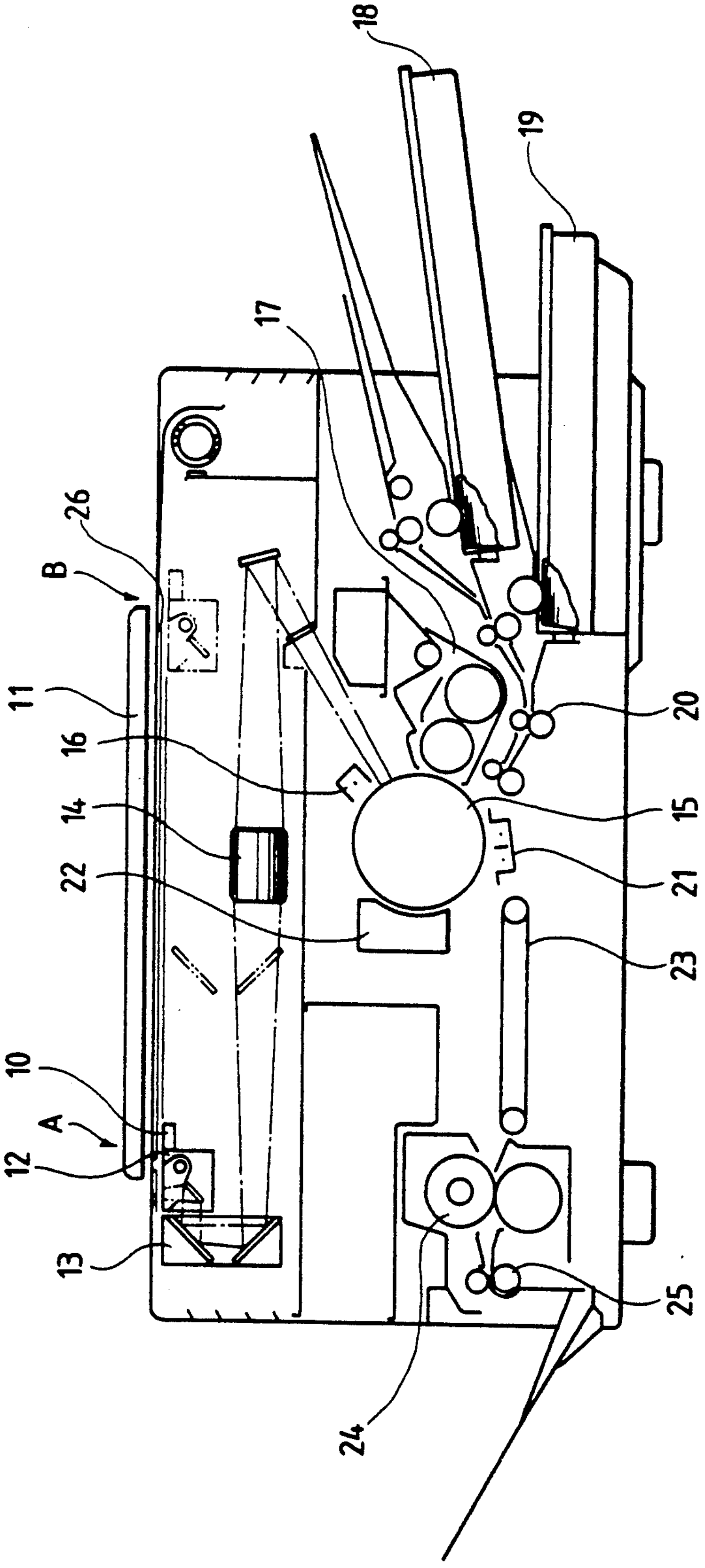
FIG. 1 PRIOR ART
FIG. 1 is a side view of an image forming apparatus equipped with an original size detecting device.

FIG. 1 is a side view of an image forming apparatus equipped with an original size detecting device. As shown in FIG. 1, the image forming apparatus has on its top a contact glass plate 26 where an original 27 (see FIG. 2) is placed, and a swingable original retainer 11 for retaining an original placed on the contact glass plate 26. A first mirror frame 12 and a second mirror frame 13 are provided below one end portion of the contact glass plate 26 for applying light reflected from the original 27 to a lens 14. The first mirror frame 12 has a reflection type sensor 10 which, as shown in FIG. 3, includes a light emitting means, namely, a light emitting element 1; and a light receiving means, namely, a light receiving element 2. The light emitting element and the light receiving element may be constituted by a phototransistor.

Disposed in the lower portion of the image forming apparatus are a photo-sensitive drum 15 for forming on its photo-sensitive surface a latent image of the image of the original 27 formed by the lens 14; a charger 16 for charging the photo-sensitive drum 15; a developing unit 17 for developing the latent image with toner; sheet supplying rollers 20 for supplying image forming sheets from sheet accommodating cassettes 18 and 19; a transferring and separating unit 21 for transferring a toner image from the photo-sensitive surface of the photo-sensitive drum 15 onto an image forming sheet and separating the latter from the photo-sensitive surface; a cleaning unit 22 for removing unnecessary toner from the photo-sensitive surface of the photo-sensitive drum 15; a conveying belt 23 for conveying to fixing unit 24 the image forming sheet on which a toner image has been transferred; and sheet discharging rollers 25 for discharging from the image forming apparatus the image forming sheet having passed through the fixing unit 24.

FIG. 3 is a diagram showing the arrangement of the original size detection device of the present invention. The light receiving element 2 of the reflection type sensor 10 is connected via a resistor R1 to one of the two input terminals of a comparator 3*a* and to an A/D conversion input terminal of a CPU 8. The other input terminal of the comparator 3*a* is connected through a resistor R2 to a second D/A conversion input terminal of the CPU 8. The output terminal of the comparator 3*a* is connected to a port PA provided on the input side of the CPU 8. The CPU 8 has a port PB on the output side, which is connected via a driver 31 and a resistor R3 to the light emitting element 1. The CPU 8 is further connected to a memory 9 in which a control program is stored.

Figure 3:
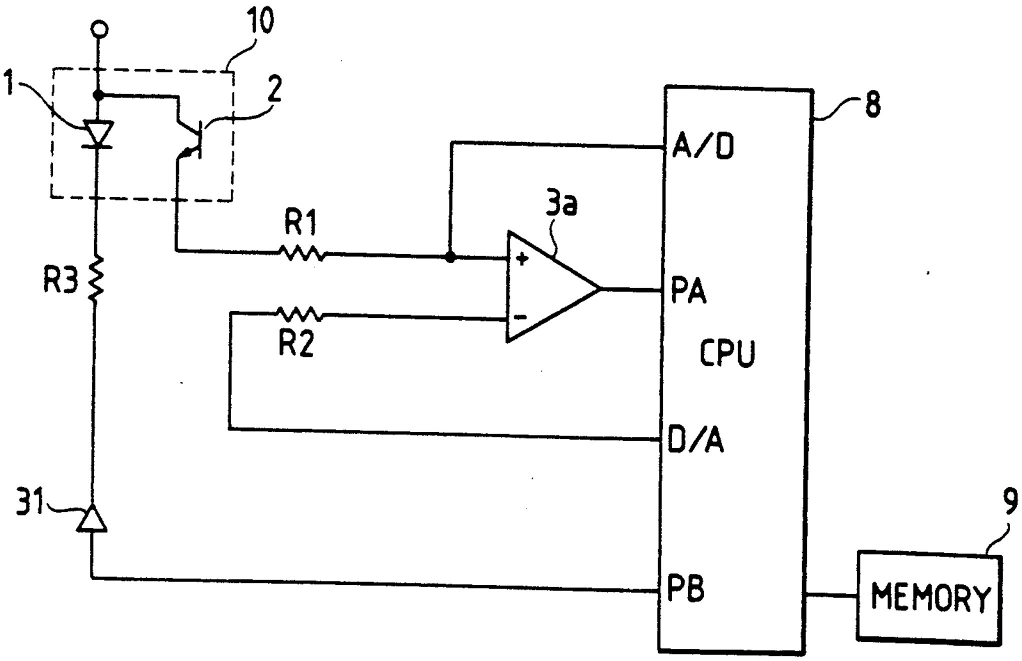
FIG. 3 is a block diagram outlining the arrangement of the detecting device of the present invention.
Figure 4:
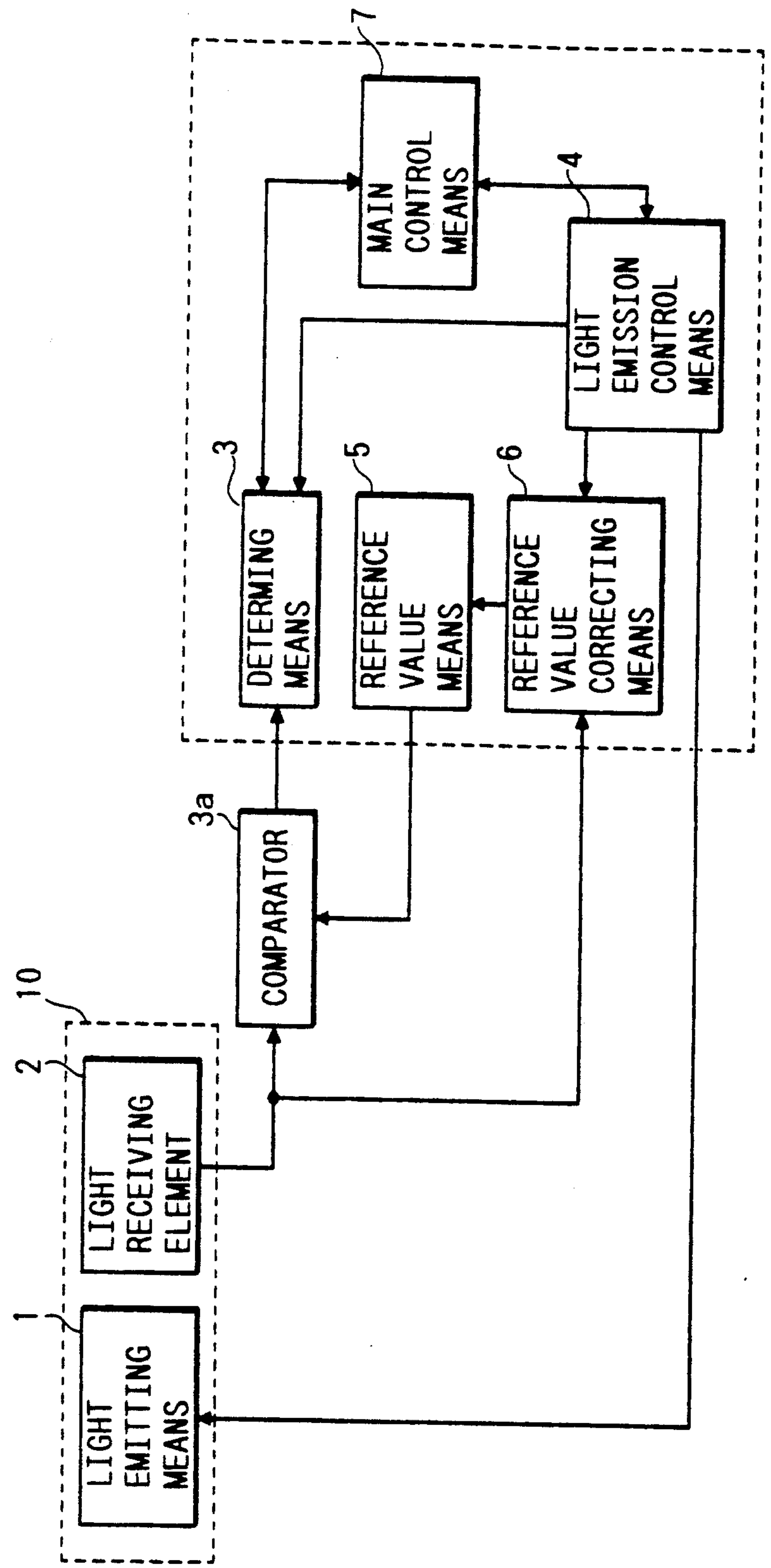
FIG. 4 is a functional block diagram of the detecting device of FIG. 3.

FIG. 4 is a functional block diagram of the circuit shown in FIG. 3 for describing the original size detecting function thereof. The light receiving element 2 is connected to comparison means 3*a* and a reference value correcting means 6. The comparison means 3*a* is connected to determining means 3 and reference value setting means 5. The light emitting element 1 is connected to light emission control means 4. The light emission control means 4 is connected to the determining means 3 and the reference value correcting means 6. The reference value correcting means 6 is connected to the reference value setting means 5. The determining means 3 and the light emission control means 4 are connected to main control means 7. The function provided by the main control means 7, the light emission control means 4, the determining means 3, the reference value correcting means 6, and the reference value setting means 5, correspond to the functions of the CPU 8 and of the control program stored in the memory 9.

The operation of the original size detection device according to the present invention will now be described.

Figure 5:
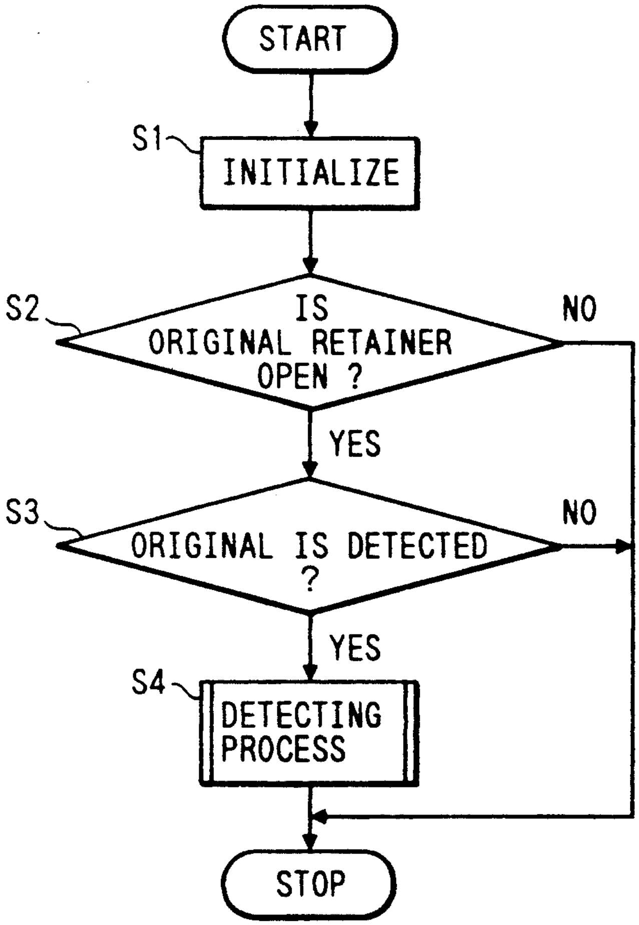
FIG. 5 is a flow chart outlining the control operation of the detecting device of the present invention.

When the power switch of the image forming apparatus is turned on, the original size detecting device is initialized (Step S1 in FIG. 5). Next, the original retainer 11 is swung upward (FIG. 2), and an original 27 is placed on the contact glass plate 26 with its one edge aligned with an original aligning position A. Next, in Step S2 of FIG. 5, it is determined with the aid of a limit switch (not shown) or the like provided near an original retainer swinging (opening and closing) unit whether the original retainer 11 is open or closed. When it is determined that the original retainer 11 is closed, the original size detecting process is not performed. When the original retainer 11 is open, then the following Steps are performed.

Upon the determination that the original retainer 11 is open, detection of whether or not an original is present on the contact glass plate 26 is performed. This detection is performed by the original size detecting reflection type sensor 10, or other suitable detecting means. When no original is detected, the original size detecting process is not carried out. Once an original is detected, the original size detecting process is carried out (Steps S3 and S4 in FIG. 5). The above-described determination and operations are carried out as described later according to signals provided by various sensor circuits (not shown) to which the main control means 7 (FIG. 4) is connected.

Figure 2:
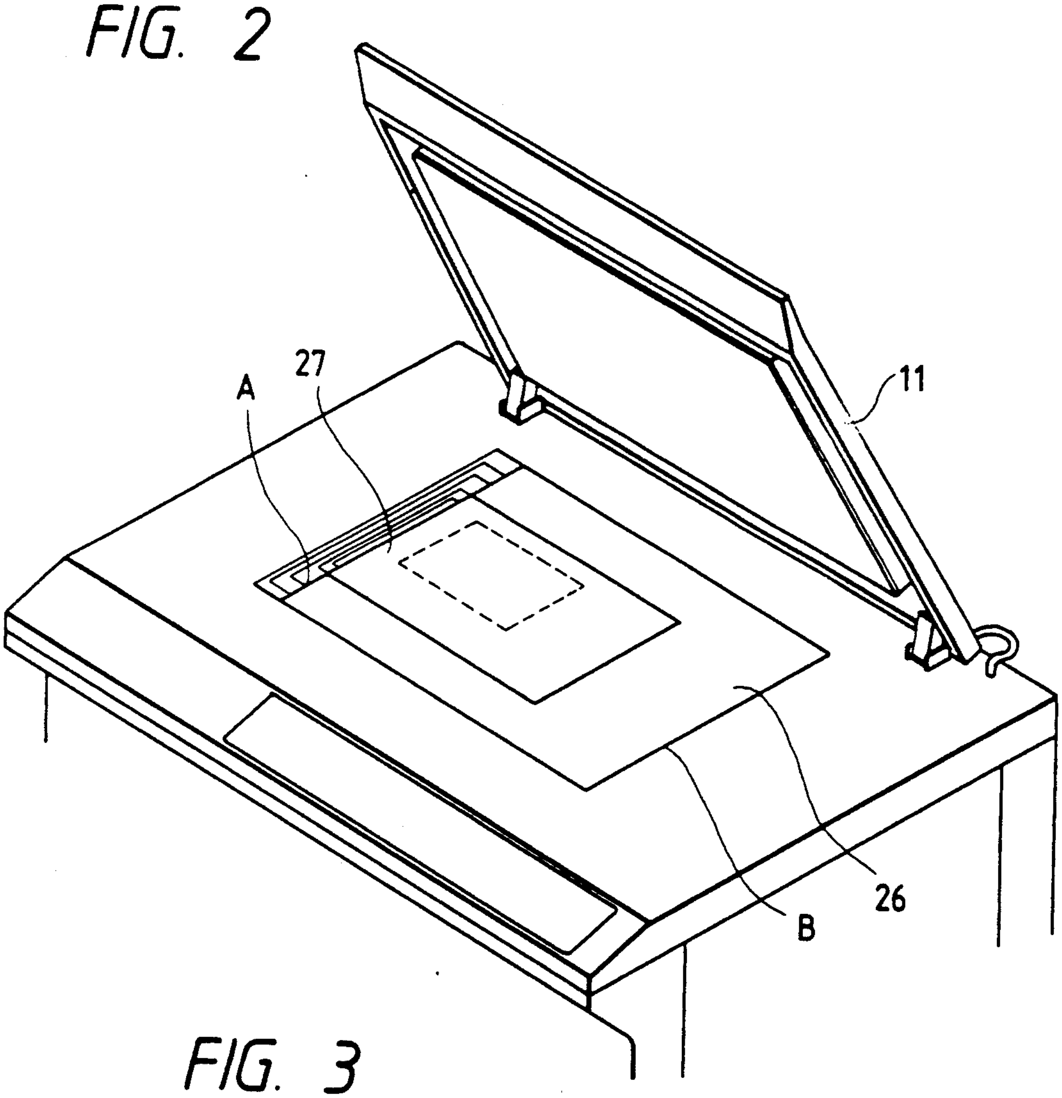
FIG. 2 is a perspective view showing an upper portion of the image forming apparatus.

In order to detect the size of an original 27, the first mirror frame 12, and accordingly the reflection type sensor 10 mounted on it, is moved from the original aligning position A towards a maximum movement position B as shown in FIGS. 1 and 2.

At the same time, the main control means 7 (FIG. 4) applies an instruction signal to the light emission control means 4 to cause the light emitting element 1 to emit light for a predetermined period. When the light emission control means 4 has caused the light emitting element 1 to suspend the emission of light, the light receiving element 2 detects external light, and the detection value of the external light is applied to the reference value correcting means 6. When the light emitting element 1 is not emitting light, the light emission control means 4 outputs a signal which permits the reference value correcting means 6 to correct the reference value set in reference value setting means 5 However, when the light emitting element 1 emits light, the light emission control means 4 outputs a signal which permits the determining means 3 to perform its determining operation.

In FIG. 3, when the CPU 8 turns off the light emitting element 1 via a signal sent from the port PB, the light receiving element 2 detects external light. The detection value of the external light is then applied via the resistor R1 to the A/D conversion circuit of the CPU 8. The detection value of the external light is normally zero or extremely small for those portion where an original 27 covers the contact glass plate 26.

Figure 6:
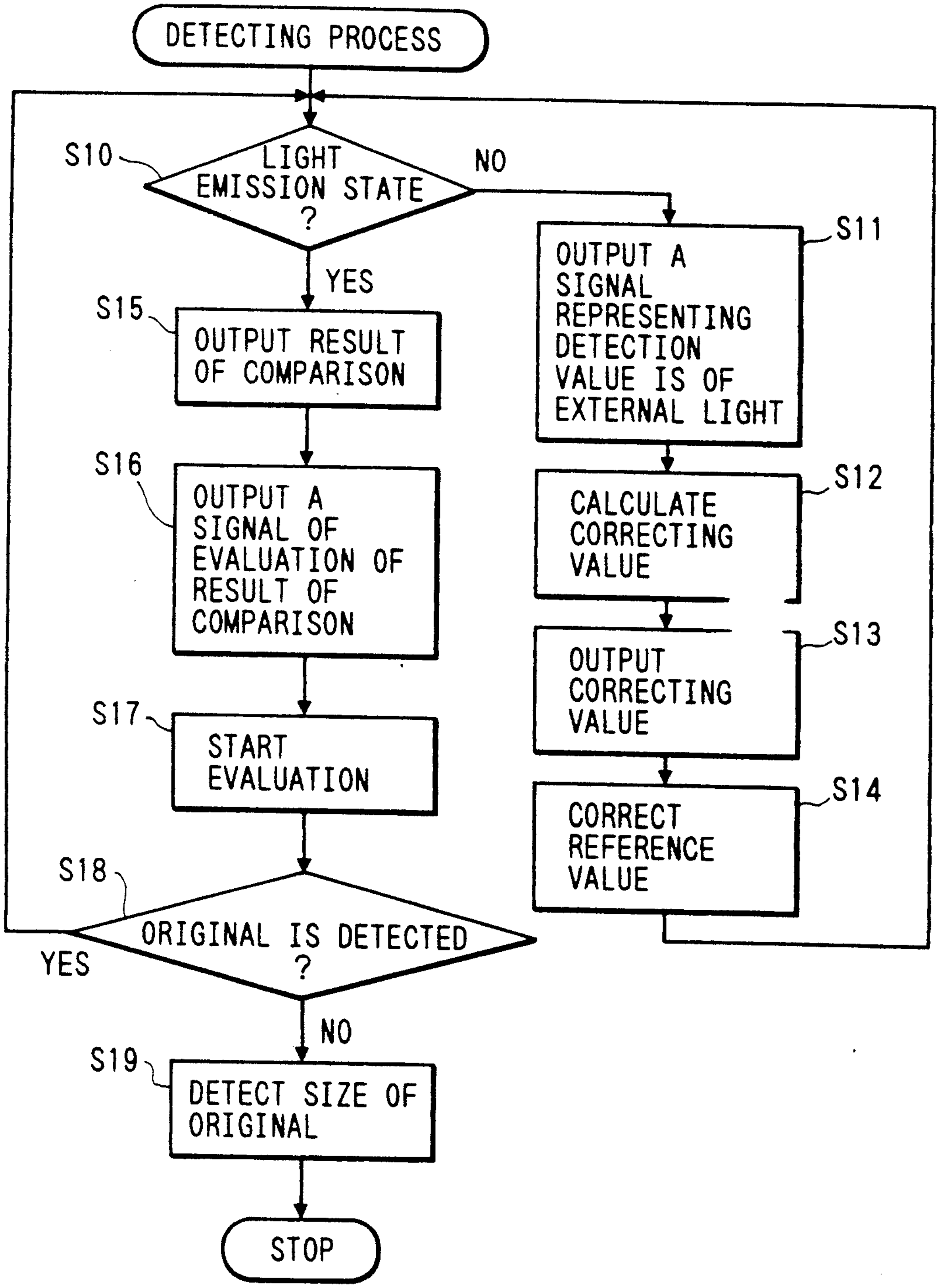
FIG. 6 is a flow chart showing the control of the original detection process.

At the beginning of the detection process, the light emitting element 1 does not emit light, i.e., a light non-emission state (Step S10 in FIG. 6). During a light non-emission state, the light emission control means 4 outputs a signal to inform the reference value correcting means 6 of the fact that the detection value from the light receiving element 2 represents external light (Step S11). As a result, the reference value correcting means 6 calculates a correcting value using the detection value (Step S12), and applies the correcting value to the reference value setting means 5. The reference value setting means 5 uses the correcting value to correct the reference value, creating a new reference value (Step S14). In FIG. 3, during a light non-emission state, the detection value of external light detected by the light receiving element 2 is applied to the A/D conversion circuit of the CPU 8. The A/D conversion circuit converts the detected value into a digital value, and the digital value of the detected value is added to the digital value of a set reference value. The resultant value is converted into an analog value by the D/A conversion circuit of the CPU 8, and applied as a new reference value to the reference value input terminal of the comparator 3*a*.

In this embodiment, the external light is detected only once during a light non-emission period.

After the reference value is corrected in the abovedescribed manner, the light emission control means 4 causes the light emitting element 1 to emit light (Step S10 in FIG. 6). As the light emitting element 1 emits light, and the detection value from the light receiving element 2 of the light reflected from the original is applied is output to the comparison means 3*a*. The comparison means 3*a* compares the detection value with the corrected reference value. The result of comparison is applied to the determining means 3 (Step S15 in FIG. 6). The light emission control means 4 applies a signal to the determining means 3 causing the determining means 3 to evaluate the result of the comparison (Step S16). The determining means 3 evaluates the result of comparison (Step S17), and determines whether or not the original 27 is covering the contact glass plate 26 at the location of reflection type sensor 10. Thus it is determined whether or not the end of the original is reached (Step S18). When it is determined that the original 27 is present, the detection process repeats starting at Step 10 so that the above-described operations are carried out depending on whether the light emitting element is in a light emission or non-emission state.

When the original is not detected in Step S18, the size of the original is then detected in Step S19 from the distance moved by reflection type sensor 10.

Figure 7:
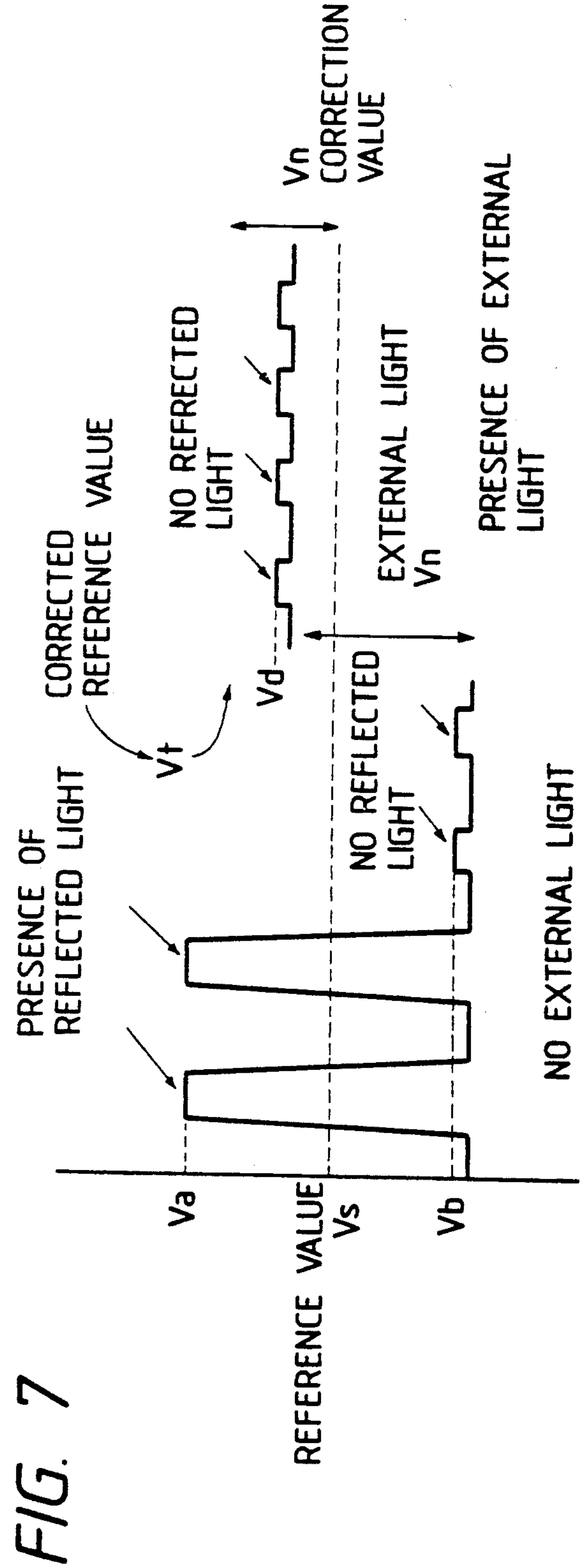
FIG. 7 is a diagram for describing the correction of a reference value.
Figure 8:
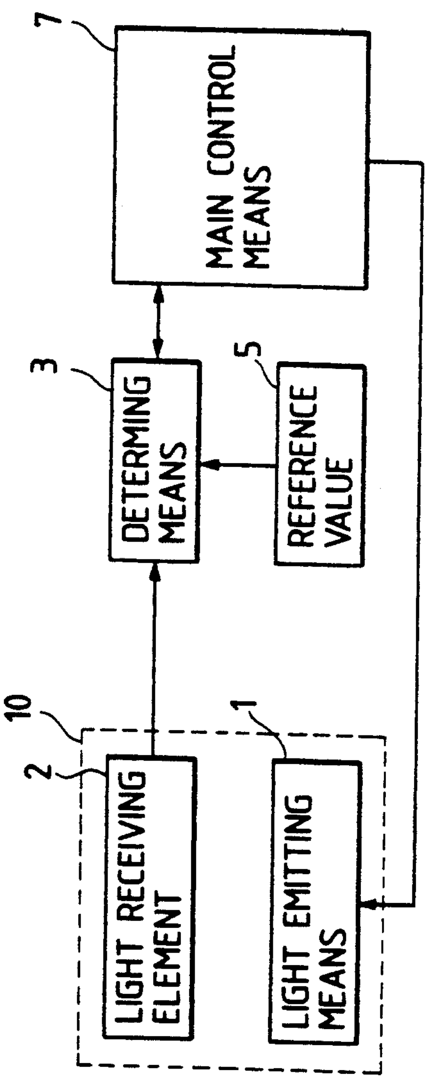
FIG. 8 is a block diagram for describing the functions of a conventional original size detecting device.

The principle behind the correction of the reference value will now be described with reference to FIG. 7. Assume that the reference value set in advance is Vs. Consider the case where there is no external light during the detection of the presence of an original. When the detection value of light reflected from the original is Va, which is larger than the reference value Vs, an original is determined to be present. However, when an original is not present, no light is reflected, and the detection value is Vb, smaller than the reference value Vs. Thus, the presence or absence of the original can be determined. Now, consider the case where external light is present having a detection value Vn larger than the reference value Vs. In this case, even if the light emitting element 1 is in the light non-emission state, the detection value when an original is not present will be Vn which is larger than the reference value Vs. Therefore an original is determined to be present although an original is not present. In order to eliminate this difficulty, the following method is employed by the present invention: External light is detected while the light emitting element 1 is not emitting light, and the detection value Vn thereof is added to the reference value Vs to obtain a new reference value Vt higher than the reference value Vs. When the light emitting element 1 next emits light, this new reference value Vt is used to determine the presence or absence of the original.

As was described above, while the light receiving element 2 is being moved under the original, the reference value is maintained substantially unchanged. However, when the light received element 2 is moved to the edge of the original, where there is no original right above the light receiving element 2, the original size detecting operation is affected by external light. This presents difficulty in detecting the presence or absence of the original.

That is, if the reflection type sensor 10 is affected by external light when it, while performing the emission and non-emission of light alternately, has moved to the edge of the original, where the original is not present right above reflection type sensor 10, then it is impossible to determine the presence or absence of the original. In order to overcome this difficulty, the light emitting element 1 is initially placed in a light non-emission state, the light receiving element 2 receives external light, and the detection value Vn thereof is applied to the reference value correcting means 6. In the reference value correcting means 6, as was described above, the detection value Vn of the external light is then added to the reference value Vs to set a corrected reference value Vt in the reference value setting means 5 (see FIG. 7).

Now, consider the next time the light emitting element 1 does not emit light. In this case, no light is reflected from the original, but there is external light, and a detection value Vd is obtained. The detection value Vd is compared with the new reference value Vt, to determined the presence of the original. There the presence of the original is found lacking by determination means 3. The result of this determination is transmitted from the determining means 3 to the main control means 7. The main control means 7 applies instruction signals to suspend the operations of the light emission control means 4, the determining means 3 and the movement of the reflection type sensor 10. Then the size of the original is detected from the amount of movement of the reflection type sensor 10.

In the invention, the reference value is corrected continuously after the reflection type sensor leaves the original aligning position A. Therefore, even if an original under test is high in transmittance, the external light passing through the original is detected and the reference value corrected. Hence, with the original size detecting device according to the present invention, the size of an original can be detected with high accuracy.

The above-described embodiment is of software using a microcomputer; however, the invention is not limited thereto or thereby. That is, the original size detecting device may be formed with hardware circuits.

Furthermore, in the above-described embodiment, the light receiving element is used in a time sharing mode; that is, external light and light reflected from the original are received by one and the same light receiving element. However, the device may be modified so that two light receiving elements are provided to receive external light and reflected light, respectively.

In addition, in the above-described embodiment, the reference value is corrected by using the detection value of external light which is detected only once per light non-emission state. However, plural external light detection values, or the average of plural detection values may be used to correct the reference value.

As is apparent from the above description, the original size detecting device of the invention provides the advantage that since the reference value is corrected with a correcting value corresponding to the intensity of external light, an erroneous size detection of an original due to external light is eliminated.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. An original size detecting device provided on an image forming apparatus, the image forming apparatus having a contact glass upon which is placed an original whose image is to be formed by said image forming apparatus, one end of said original and said contact glass being aligned, the original size detecting device comprising:

light emitting means, disposed at one end of said contact glass and on an opposite side of said contact glass from said original, said light emitting means traversing from said one end of said contact glass to another end of said contact glass;

light emission control means for controlling the periodic emission and non-emission of light from said light emitting means;

light detecting means for detecting light emitted from said light emitting means and reflected by said original, and for detecting external light according to a signal which said light emission control means provides in response to the non-emission of light from said light emitting means;

reference value setting means for setting a reference value;

reference value correcting means for determining a correcting value based on said detected external light, and for correcting said reference value using said correcting value so that said reference value setting means sets a corrected reference value;

determining means for determining the presence/absence of an original at a position of said light emitting means based on output from said light detecting means and said corrected reference value; and size determining means for determining a size of said original from a distance said light emitting means traversed across said contact glass until said determining means indicated an absence of said original.

2. The original size detecting device as in claim 1, wherein said determining means compares said output from said light detecting means to said corrected reference value, when said output from said light detecting means is greater than said corrected reference value an original is determined as present, and when said output from said light detecting means is less than or equal to said corrected reference value an original is determined as absent.

3. The original size detecting device as in claim 1, wherein said reference value correcting means corrects the reference value by adding said correcting value representing said detected external light to said reference value.

4. A method for determining the size of an original provided on an image forming apparatus, the image forming apparatus having a contact glass upon which is placed an original whose image is to be formed by said image forming apparatus, one end of said original and said contact glass being aligned, the method comprising the steps of:

causing a light emitting means, which is disposed at one end of said contact glass and on an opposite side of said contact glass from said original, to traverse from said one end of said contact glass to another end of said contact glass;

controlling the light emitting means to periodically emit light;

detecting light emitted from said light emitting means and reflected by said original;

detecting external light when said light emitting means is not emitting light;

setting a reference value;

determining a correcting value based on said detected external light;

correcting said reference value using said correcting value to set a corrected reference value; and determining a presence/absence of an original at a position of said light emitting means based on said detection of light emitted and said corrected reference value;

determining a size of said original from a distance said light emitting means traversed across said contact glass until an absence of said original above said light emitting means was determined.

5. The method as in claim 4, wherein in the step of said determining a presence/absence said output from said light detecting means is compared to said corrected reference value, when said output from said light detecting means is greater than said corrected reference value an original is determined as present, and when said output from said light detecting means is less than or equal to said corrected reference value an original is determined as absent.

6. The method as in claim 4, wherein in the step of correcting said reference value, the reference value is corrected by adding said correcting value representing said detected external light to said reference value.

7. An original detecting device provided on an image forming apparatus, the image forming apparatus having a contact glass upon which is placed an original whose image is to be formed by said image forming apparatus, one end of said original and said contact glass being aligned, the original detecting device comprising:

light emitting means;

light emission control means for controlling the periodic emission and non-emission of light from said light emitting means;

light detecting means for detecting light emitted from said light emitting means and reflected by said original, and for detecting external light according to a signal which said light emission control means provides in response to the non-emission of light from said light emitting means;

reference value setting means for setting a reference value;

reference value correcting means for determining a correcting value based on said detected external light, and for correcting said reference value using said correcting value so that said reference value setting means sets a corrected reference value; and determining means for determining the presence/absence of an original based on output from said light detecting means and said corrected reference value.

8. The original detecting device as in claim 7, wherein said determining means compares said output from said light detecting means to said corrected reference value, when said output from said light detecting means is greater than said corrected reference value an original is determined as present, and when said output from said light detecting means is less than or equal to said corrected reference value an original is determined as absent.

9. The original detecting device as in claim 7, wherein said reference value correcting means corrects the reference value by adding said correcting value representing said detected external light to said reference value.

10. The original detecting device as in claim 7, wherein said light emitting means is disposed at one end of said contact glass and on an opposite side of said contact glass from said original, said light emitting means traversing from said one end of said contact glass to another end of said contact glass; and said determining means determining the presence/absence of an original at a position of said light emitting means.

11. A method for determining an original provided on an image forming apparatus, the image forming apparatus having a contact glass upon which is placed an original whose image is to be formed by said image forming apparatus, one end of said original and said contact glass being aligned, the method comprising the steps of:

controlling a light emitting means to periodically emit light;

detecting light emitted from said light emitting means and reflected by said original;

detecting external light when said light emitting means is not emitting light;

setting a reference value;

determining a correcting value based on said detected external light;

correcting said reference value using said correcting value to set a corrected reference value;

determining a presence/absence of an original based on said detection of light emitted and said corrected reference value.

12. The method as in claim 11, wherein in the step of said determining a presence/absence said output from said light detecting means is compared to said corrected reference value, when said output from said light detecting means is greater than said corrected reference value an original is determined as present, and when said output from said light detecting means is less than or equal to said corrected reference value an original is determined as absent.

13. The method as in claim 11, wherein in the step of correcting said reference value, the reference value is corrected by adding said correcting value representing said detected external light to said reference value.

14. The method as in claim 11, wherein said light emitting means is disposed at one end of said contact glass and on an opposite side of said contact glass from said original, said light emitting means traverses from said one end of said contact glass to another end of said contact glass; and in said determining the presence/absence step, the presence/absence of an original at a position of said light emitting mean is determined.

* * * * *